United States Patent [19]
Pratt et al.

[11] Patent Number: 5,662,946
[45] Date of Patent: Sep. 2, 1997

[54] ADAPTABLE MOLD BASE

[75] Inventors: Steven Duane Pratt, Plantation; Robert W. Pennisi, Boca Raton; Glenn F. Urbish, Coral Springs, all of Fla.

[73] Assignee: Motorola, Inc., Schaumburg, Ill.

[21] Appl. No.: 318,311

[22] Filed: Oct. 5, 1994

[51] Int. Cl.⁶ .................................................. B29C 33/20
[52] U.S. Cl. ...................... 425/190; 425/192 R; 425/195; 425/552; 425/577
[58] Field of Search .................................. 425/186, 185, 425/190, 195, 577, 192 R, 552, 162

[56] References Cited

U.S. PATENT DOCUMENTS

| | | | |
|---|---|---|---|
| 2,956,321 | 10/1960 | Halward | 22/68 |
| 3,025,570 | 3/1962 | Halward | 18/42 |
| 3,266,086 | 8/1966 | Markevitch | 425/190 |
| 3,947,210 | 3/1976 | Levites | 425/441 |
| 4,009,979 | 3/1977 | Martin | 425/107 |
| 4,337,022 | 6/1982 | Laurent et al. | 425/593 |
| 4,500,275 | 2/1985 | Ruhl | 425/185 |
| 4,550,006 | 10/1985 | Laghi | 425/183 |
| 4,551,084 | 11/1985 | Lake | 425/185 |
| 4,810,182 | 3/1989 | Groll | 425/190 |
| 4,828,478 | 5/1989 | Hehl | 425/190 |
| 4,836,071 | 6/1989 | Ersoy et al. | 83/140 |
| 5,262,116 | 11/1993 | Von Holdt, Sr. | 264/297.2 |
| 5,456,588 | 10/1995 | Yonekubo et al. | 425/190 |

*Primary Examiner*—Thomas R. Weber
*Attorney, Agent, or Firm*—Dale W. Dorinski

[57] ABSTRACT

An adaptable mold assembly (10) consists of two mold bases (100, 102). One or both of the mold bases has at least one interchangeable portion (104, 105) removably mounted on the mold base, whose function is to actuate in a direction different from the draw direction. The interchangeable portion is typically used to facilitate the removal of the molded part from the mold, and often functions as a mold slide or pull. The ability to interchange and reconfigure the mold base reduces tooling costs and adds design flexibility to the tool. In another embodiment of the invention, the function of the interchangeable portion (106) is to provide process monitoring, process control or process optimization.

11 Claims, 5 Drawing Sheets

ADAPTABLE MOLD BASE

TECHNICAL FIELD

This invention relates in general to molding and casting, and more particularly to an adaptable tool for use in molding and casting processes.

BACKGROUND

Numerous molding techniques have been employed in order to make a wide variety of molded items using metal molds with, for example, high pressure injection molding, reaction injection molding (which occurs at a lower pressure), thermoset transfer molding, ceramic or metal injection molding, die-casting, and gravity casting processes. In each of these situations, a mold or mold frame and a die are required in order to form the finished object. In many of the molding installations, for example, injection molding, the mold is mounted on a portion of the molding machine and connected directly to the molding machine so that a fluid material may be injected directly into the mold. Typically, a single molding machine is used to make a wide variety of molded articles. In these cases the mold and/or mold base is removed from the injection molding machine and replaced with a different mold when it is desired to switch production from one molded item to another.

Most injection molds are complex mechanical assemblies employing hock-out pins, ejector pins, slides, pulls, and removable cores in order to create the desired, complex molded shapes. These configurations are required, typically one or more for each molded part, in order to allow the molded part to be removed from the molding apparatus, and this can make the mold itself very complex and costly. Thus the fabrication of the mold and the mold base is typically a rather complex and time-consuming affair.

In the design, prototype, and production phases of a molded article, the exact configuration of the mold usually changes as the design is iterated. This typically requires movement or addition or deletion of some of the knock-out pins, slides, pulls and cores. In the prior art these modifications were addressed by creating an entirely new mold base. The cycle time required in order to fabricate these complex mold bases typically is on the order of three to six months. When it is considered that a typical molded plastic article has several design iterations, it is clear that the time from concept to a final production mold can be anywhere from four months to over one year. This extensive time period creates high tooling costs and long lead times, which obviously are translated into increased manufacturing costs which are ultimately passed on to the consumer. It would be desirable to reduce this cycle time and dollar cost in order to bring products to market in a shorter time frame.

SUMMARY OF THE INVENTION

Briefly, according to the invention, there is provided an adaptable mold base assembly consisting of two mold halves. One or both of the mold halves has at least one interchangeable portion whose function is to actuate in a direction different from the draw direction. In another embodiment of the invention, the function of the interchangeable portion is to provide process monitoring, process control or process optimization.

DETAILED DESCRIPTION OF THE PREFERRED EMBODIMENT

Figure 1:
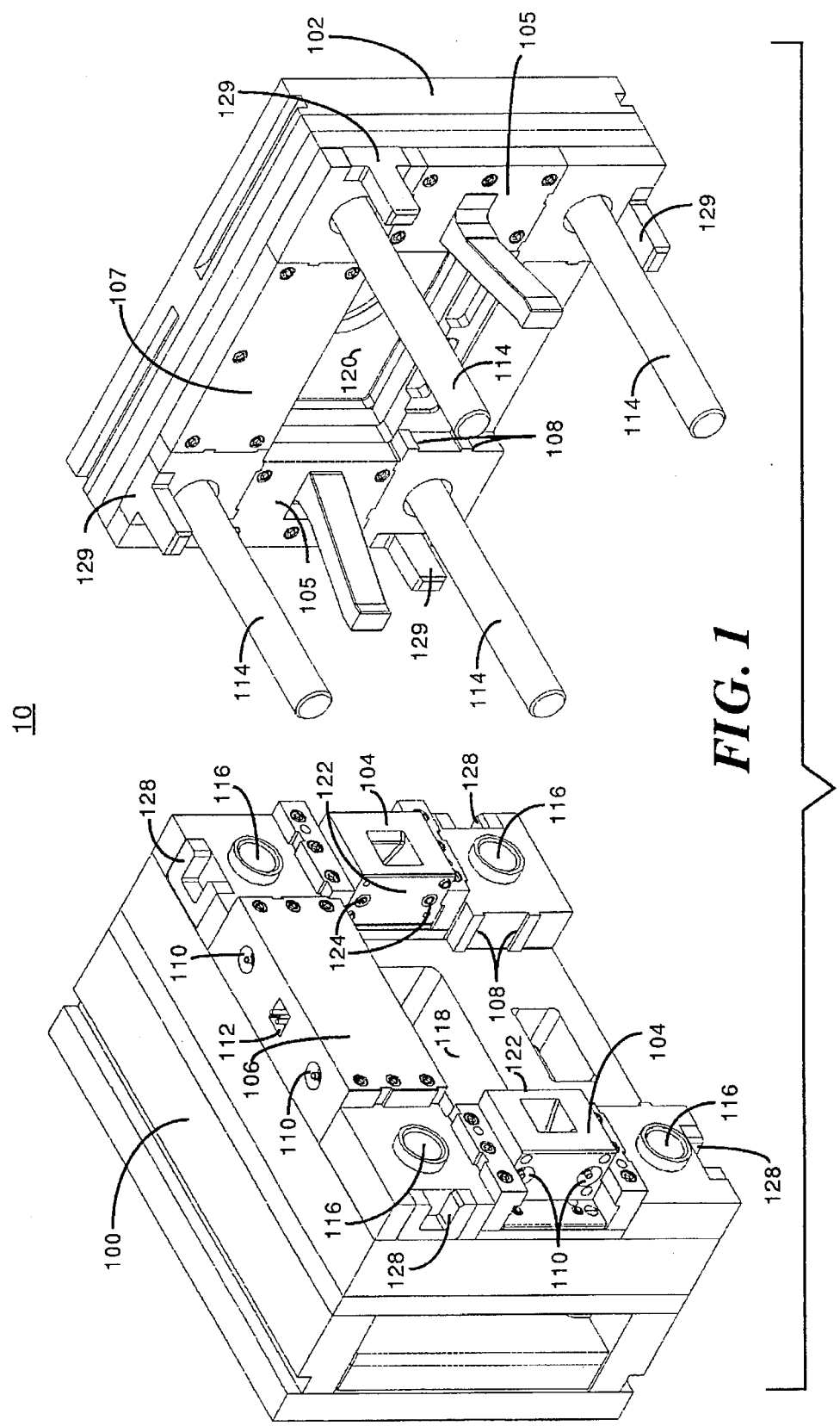
FIG. 1 is a perspective view of the adaptable mold base separated into its two component halves, in accordance with the invention.

While the specification concludes with claims defining the features of the invention that are regarded as novel, it is believed that the invention will be better understood from a consideration of the following description in conjunction with the drawing figures, in which like reference numerals are carried forward. It is to be understood that the elements of the invention can be variously arranged and organized, and that the invention is not limited to the precise arrangement and organization as shown and described.

The present invention provides an adaptable mold base assembly which is flexible in design and thus is capable of being adapted to function in a multitude of configurations with minimal modifications to the base. More particularly, it provides a master mold base system having standardized and interchangeable components that are mounted on the master base, customizing it for a particular molding need. The interchangeable components provide functionality that is specific to the particular molding need. Because of its standardization, flexibility and adaptability, the present invention is particularly well suited for use throughout a product's complete development cycle, being able to adapt along with the evolving product design, while remaining cost effective through re-use of the master base and tool components. The present invention can follow a product from conception, on through prototyping, and into production, at which point it can function as the actual production tool. The tool components can also be transferred to a dedicated production mold base.

Referring now to FIG. 1, there is illustrated a preferred embodiment of the present invention as utilized in an injection molding machine. An adaptable mold base 10 is comprised of a first or fixed mold half 102, usually rigidly supported in the injection molding press, and a second or moveable mold half 100, commonly called the ejector half of the mold base assembly. When assembled in the injection molding press, the ejector half 100 is connected to the fixed half 102 via a plurality of leader pins 114 that are inserted into corresponding leader pin bushings 116. Assembled in this fashion, the ejector half 100 is adapted for movement relative to fixed half 102 between an open and closed position. The direction parallel to the movement of the ejector half 100 relative to fixed half 102 is conventionally defined as the "draw direction", and the plane that is normal to the draw direction, passing through the surface of contact between ejector half 100 and fixed half 102, is conventionally known as the "parting plane". Alignment and registration of the two closing mold halves is aided by outboard side-locks 128 and 129 respectively. The actual molding chamber, not pictured for sake of simplicity, is formed by die inserts comprising a core assembly, a cavity assembly, side cores and/or internal lifters. These die insert assemblies are assembled into a pocket 118 in the ejector half 100 and a corresponding pocket 120 in the fixed half 102, with the core assembly inserts usually located in the ejector half 100, and the cavity assembly inserts in fixed half 102. Also incorporated in the adaptable mold base 10, but not shown in the drawings, are a system for the ejection of parts after being molded, a system of cooling lines and cooling channels, a system of mold plates for part degating and sprue removal, and components whose function is to transfer the molten material from the injection molding press into the actual molding chamber.

Actuation mechanism assemblies 104 and 105 are designed to be interchangeable, "off-the-shelf" components to be removed or replaced from the adaptable mold base 10 as required. In this fashion, the adaptable mold base 10 is afforded the flexibility and functionality to mold a variety of parts with differing geometries, and the adaptability to change the configuration and functionality of the mold base quickly and efficiently if the need arises. Actuation mechanism assemblies 104 are shown assembled to the ejector half 100, and function as interchangeable external slide mechanisms. Corresponding angle actuator assemblies 105 are shown assembled to fixed half 102. Collectively, the assemblies 104 and 105 comprise standardized and interchangeable actuation mechanism assemblies whose function is to perform actuation in a direction that is different than the draw direction; usually this direction is normal to the draw direction. Those versed in the injection molding art will readily understand the utility of these "side-action" mechanisms for performing side coring and forming undercuts in the molded part.

The actuation mechanism assemblies 104 and 105 are typically attached to the mold halves with screws. Alignment and registration of the actuation mechanism assemblies is ensured via interlocking keyed surfaces 108. The part geometry forming die inserts for forming side cores and external undercuts are attached to surface 122 of the actuation mechanism assemblies 104. Cooling of these side-action die inserts is provided through cooling line connections 110 in the actuation mechanism assemblies 104. Watertight seals between the cooling connections 110 and the side-action die inserts are obtained via o-rings, gaskets, or other sealing means.

Also shown assembled to the ejector half 100 and the fixed half 102 are interchangeable blank modules 106 and 107, respectively. These modules are utilized in instances whereby side-actuation is not necessary, or other functionality such as process control, process optimization and/or process monitoring is desired. One example of process control is the proper utilization of cooling channels within the mold base. Those skilled in the injection molding art will appreciate the impact that the proper cooling has on the injection molding process and subsequent molded part quality and performance. The cooling line connections 110 in the interchangeable blank module 106 provide increased flexibility in the number of possible locations to place cooling lines near the molding chamber formed by pockets 118 and 120. This ability to experiment with alternative cooling line configurations using the interchangeable blank modules 106 and. 107 provides heretofore unattainable flexibility in the molding tool. The optimum cooling line locations for a specific part can be empirically determined with relative ease and little cost. This traditional method of process optimization is ideally suited for the present invention, but is prohibitively expensive when using conventional mold bases. Usually optimization of cooling channels is either not practiced, or is accomplished using sophisticated and expensive mold analysis software which requires extensive expertise and a substantial amount of time.

Another use for the interchangeable blank modules 106 and 107 is the implementation of process monitoring systems, such as observation windows, temperature sensors, pressure sensors, theology probes, video cameras, etc. These uses are depicted by the connector 112, shown in this representation as an electrical connection for a process monitoring device located in the interchangeable blank module 106.

Many benefits are obtained by the molder, the tool designer and the tool builder when using the present invention. First, by re-using the mold base, both time and money are saved, providing a competitive edge over those individuals using traditional methods. Secondly, it is much easier for the molder and tool builder to deal with relatively small and light-weight interchangeable components and die inserts than it is to deal with bulky, heavy mold bases. The adaptable mold base does not need to be transported between the molders and tool builder, since only the inserts are fabricated and transported. Finally, by standardizing the tool components and mechanisms, the tool designer and tool builder can focus on the core assembly and cavity assembly inserts, rather than spending time re-designing and re-tooling components and mechanisms that do not substantially change from one mold base assembly to the next. This reduces cycle time and increases the amount of craftsmanship utilized and satisfaction gained during the process of designing and tooling for a particular project by eliminating the methodical, repetitious task of designing and fabricating standard mold mechanisms.

Figure 2:
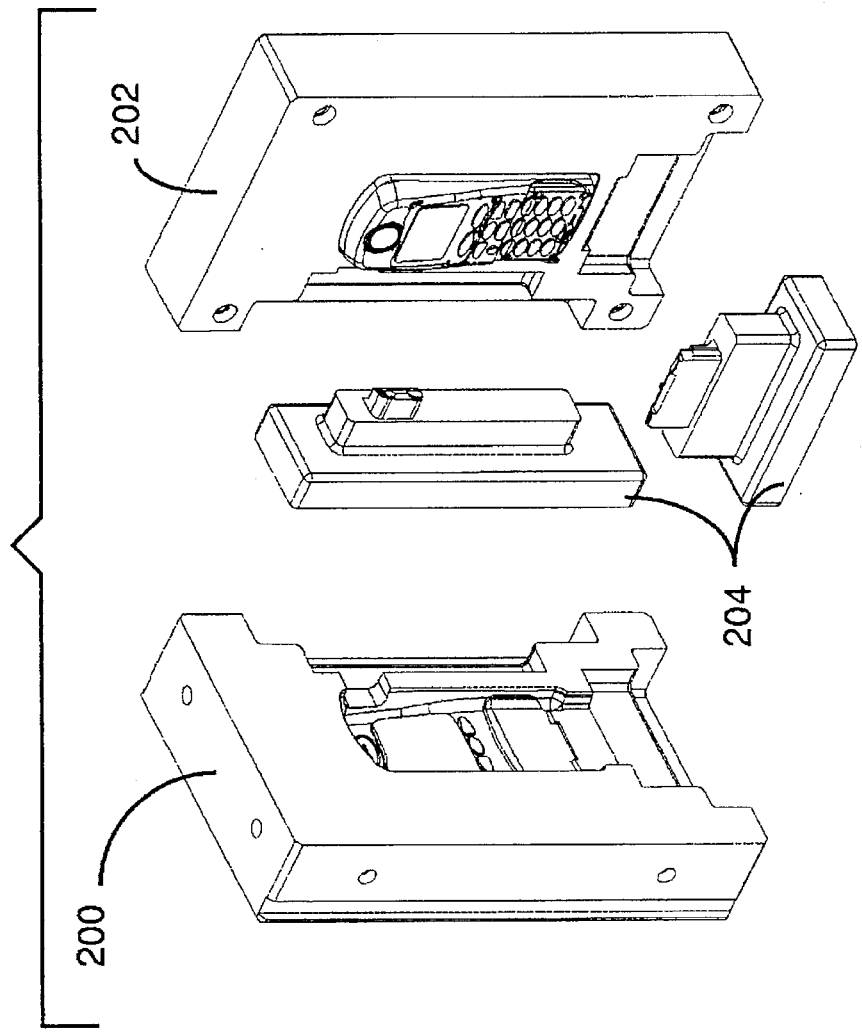
FIG. 2 is a perspective view of another embodiment of the invention used for fabricating a housing.

Turning now to FIG. 2, a set of die inserts for a particular molded part are shown. The inserts are fabricated from standardized "off-the-shelf" stock insert parts that fit into the adaptable mold base. The set of inserts includes the core insert assembly 202, the cavity insert assembly 200, and two side-action inserts 204.

Figures 3, 4:
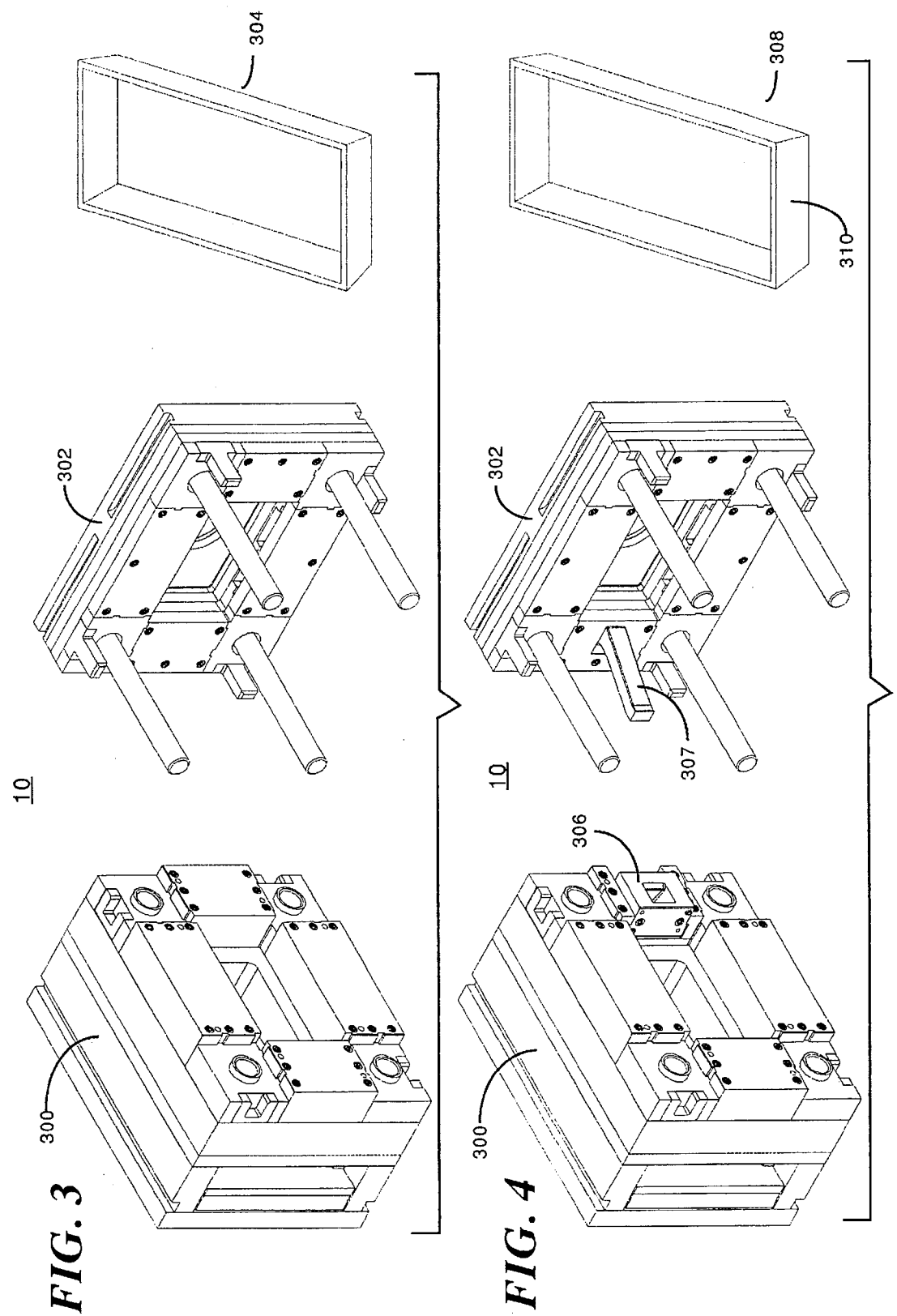
FIGS. 3–7 depict various stages in the evolution of an example product design, illustrating an example of how the adaptable mold base can be changed.
Figures 5, 6:
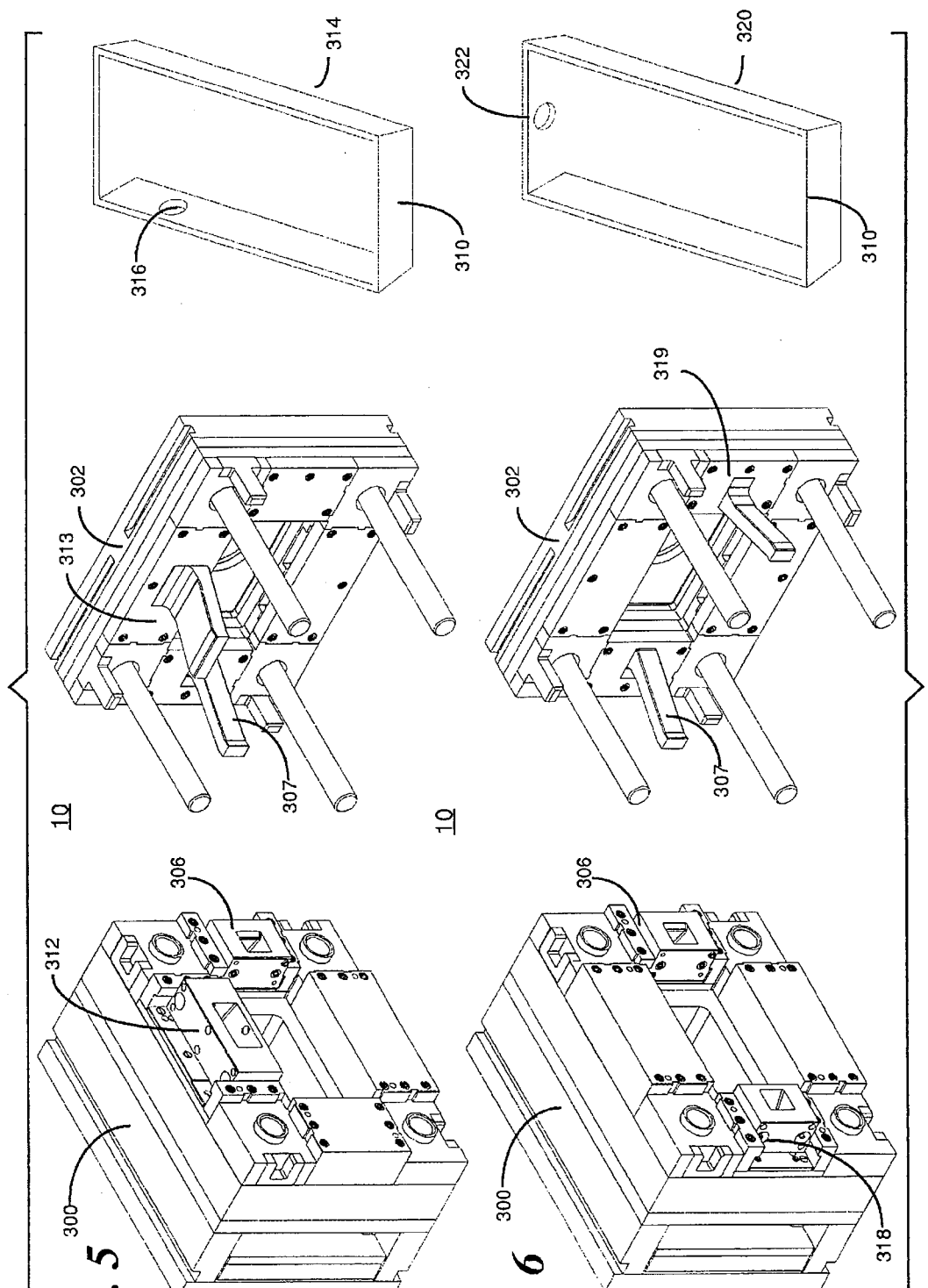
Figure 7:
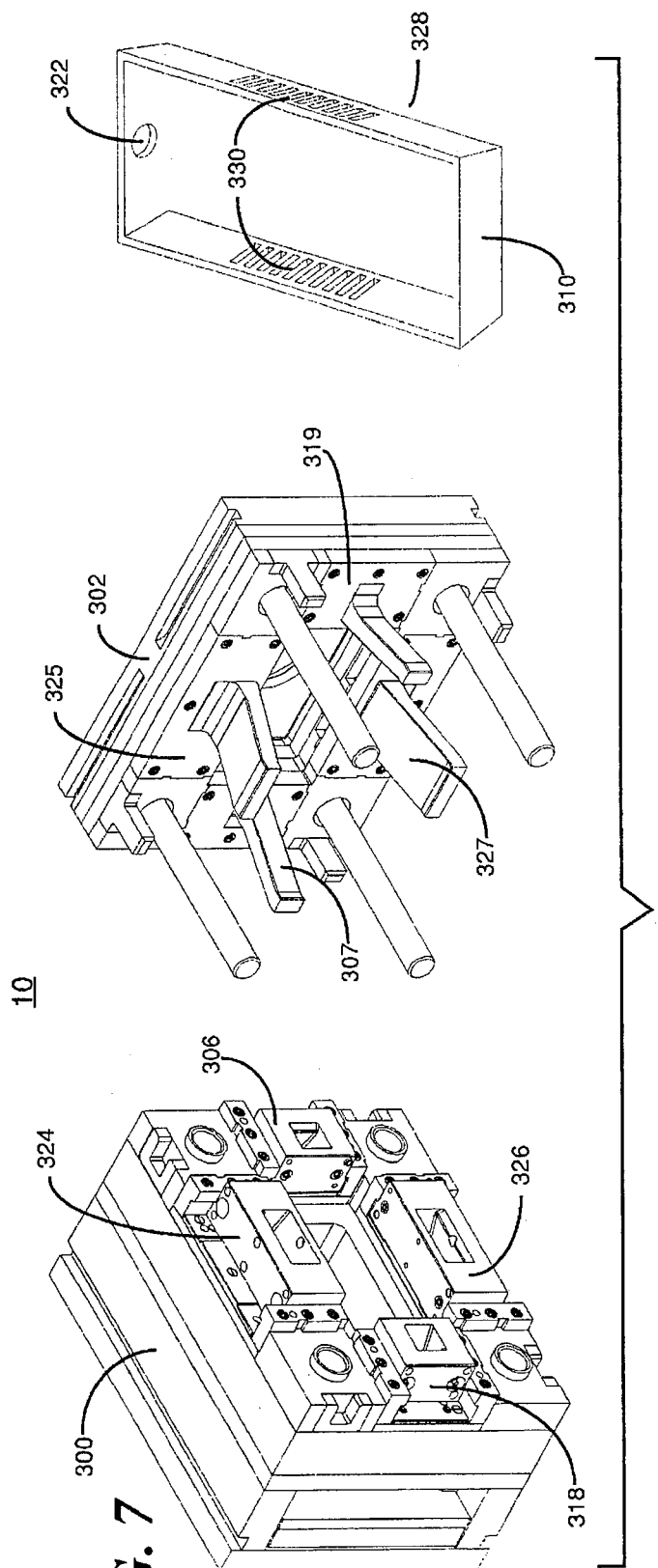

FIGS. 3–7 illustrate an example of how the present invention can be implemented into the product design loop, using a hypothetical design scenario to illustrate the concept. The figures show five consecutive design iterations of a molded electronic housing, from concept to final design. FIG. 3 displays the initial design, a simple five-sided box 304 with all four walls having a draft angle. No side actuation mechanisms are required to mold this part. The second iteration 308 of the five-sided box is depicted in FIG. 4. A change has been made to the bottom wall 310. The draft angle has been removed, making the wall vertical. A side-action is required in the mold base in order to form vertical walls, so the ejector half 300 and fixed half 302 are now fitted with side actuation mechanism assemblies 306 and 307. FIG. 5 shows the third design iteration 314 of the five-sided box. A hole 316 has been added to the left wall, therefore side actuation mechanism assemblies 312 and 313 are added to the ejector half 300 and fixed half 302, respectively. On the fourth design iteration 320, shown by FIG. 6, the hole 322 has been moved to the top of the part. Side actuation mechanisms 312, 313 have been removed and replaced with blank modules. New side actuation mechanisms 318, 319 have been added to facilitate formation of the hole and removal of the part. FIG. 7 displays the final design iteration 328. This design has louvers 330 added to the side walls, therefore the remaining two blank modules are removed from the mold halves and replaced with side actuation mechanisms 324, 325, 326 and 327.

The present invention clearly has many benefits to offer the product development community. Money is saved and cycle time is reduced because the mold base is reused and a majority of the mold mechanisms are "off-the-shell", interchangeable components. Lower tooling cost, flexibility and adaptability allow the adaptable molding system to be used by the product design group early in the design cycle for prototyping. Using the downstream production process early in the design loop results in prototypes that have the same characteristics of the final production part; therefore design knowledge and process knowledge gained during the design iterations allows more intelligent design choices to be made. It has been shown in the literature and in practice that design changes made early in the cycle consume less time and money, resulting in substantial savings. Another benefit of the adaptable molding system is that once the final design iteration is completed, the adaptable tool now becomes the 'production tool'. No additional time is required between the prototype and production phase to fabricate a final 'production tool', as is the case in the traditional product development method. The adaptable tool inserts can also be transferred to a dedicated mold base. Finally, the inserts can be used as an emergency backup tool, or an extra set of inserts can be created at a lower cost than creating an entire mold base and tool set.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An adaptable mold base assembly for forming a variety of parts having side holes or undercuts by injection molding, comprising:

first and second mold halves arranged to mate with each other, forming an adaptable mold base assembly having a draw direction;

at least one mold half having mechanically, hydraulically, pneumatically or electrically actuated interchangeable side actuation modules for forming the side hole or undercut, the modules slideably attached to the mold half to move independently of and relative to the mold half in a direction different from the draw direction;

at least one mold half having one or more interchangeable process control modules to perform process control or process monitoring; and said mold halves having common mounting features that permit the adaptable mold base to be modified to form a part having different undercuts or side holes by removing an interchangeable side actuation module and replacing it with a different interchangeable side actuation module or with a process control module.

2. The adaptable mold base assembly as described in claim 1, wherein the interchangeable side actuation module is cam actuated in a direction orthogonal to the draw direction and is keyed to a mating feature on the mold half.

3. The adaptable mold base assembly as described in claim 1, further comprising an interchangeable blank module that fills one or more of said plurality of locations that is not being occupied by either the interchangeable side actuation module that forms a side hole or undercut or by the interchangeable process control module.

4. The adaptable mold base assembly as described in claim 1, wherein the interchangeable process control module further comprises one or more modules selected from the group consisting of observation windows, temperature sensing modules, cooling modules, pressure sensor modules and rheology probe modules.

5. An adaptable mold base assembly having interchangeable actuation mechanisms for forming a variety of parts having side holes or undercuts by molding, comprising:

first and second mold halves arranged to mate with each other, forming an adaptable mold base assembly having a draw direction;

at least one mold half having one or more interchangeable side actuation modules for forming the side hole or undercut, the modules slideably attached to the mold half to move independently of and relative to the mold half in one or more directions that are different from the draw direction; and said mold half having common mounting features in a plurality of locations that permit the adaptable mold base to be modified to form a part having different undercuts or side holes by removing an interchangeable side actuation module and replacing it with a different interchangeable side actuation module.

6. The adaptable mold base assembly as described in claim 5, wherein one or more of the interchangeable side actuation modules is mechanically, hydraulically, pneumatically or electrically actuated.

7. The adaptable mold base assembly as described in claim 5, wherein the interchangeable side actuation module further comprises one or more modules selected from the group consisting of ejector pin modules, core pin assemblies, side cores, slide assemblies, pull assemblies and unscrewing modules.

8. The adaptable mold base assembly as described in claim 5, further comprising interchangeable blank modules that occupy one or more of said plurality of locations that are not occupied by the interchangeable side actuation modules.

9. An adaptable mold base assembly for forming a part by injection molding, comprising:

first and second mold halves arranged to mate with each other, forming an adaptable mold base assembly;

at least one mold half having one or more interchangeable process control modules to perform process control, process optimization or process monitoring;

said mold half and said one or more interchangeable process control modules having common mounting features that permit the interchangeable process control modules to be mounted in a plurality of locations and in a plurality of orientations.

10. The adaptable mold base assembly as described in claim 9, wherein the interchangeable process control modules further comprise one or more modules selected from the group consisting of observation windows, temperature sensing modules, pressure sensor modules and rheology probe modules.

11. An adaptable mold base assembly for forming a part by injection molding, comprising:

first and second mold halves arranged to mate with each other, forming an adaptable mold base assembly;

at least one mold half having one or more interchangeable cooling modules, each interchangeable cooling module containing a unique configuration of cooling channels;

said mold half and said interchangeable cooling modules having common mounting features that permit the interchangeable cooling modules to be mounted in a plurality of locations and in a plurality of orientations.

* * * * *